Aug. 7, 1956 K. C. BUGG 2,757,873
COIL WINDING MACHINE
Filed July 2, 1952 3 Sheets-Sheet 3
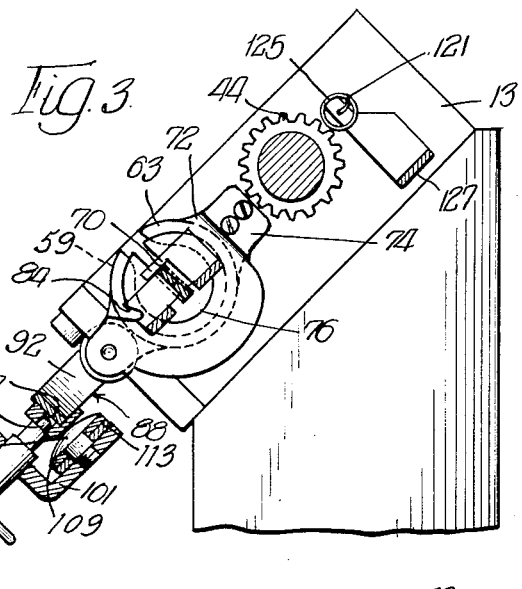
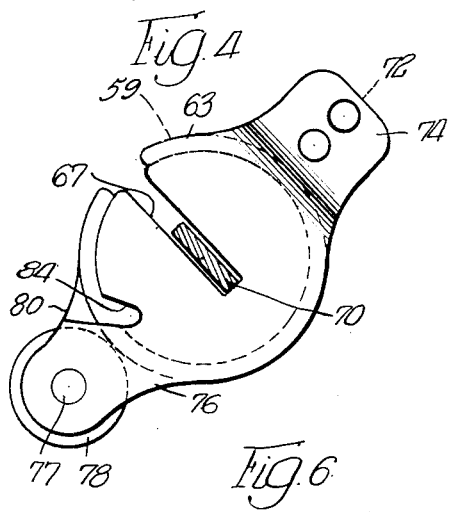
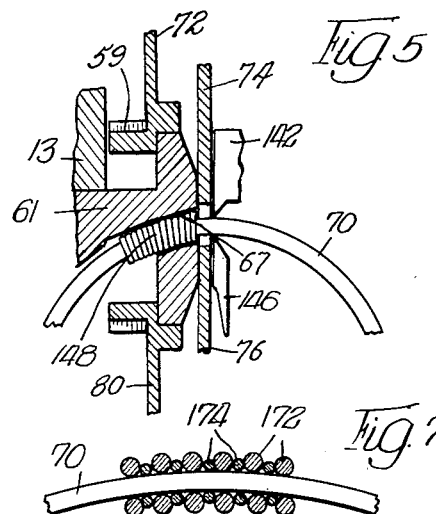
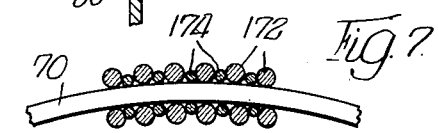
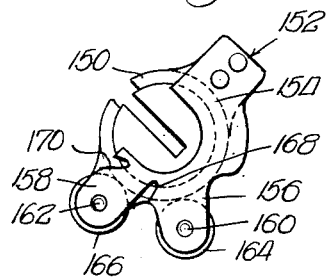
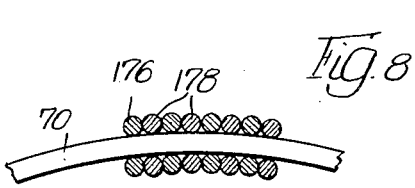
INVENTOR.
*Kenly C. Bugg,*
BY

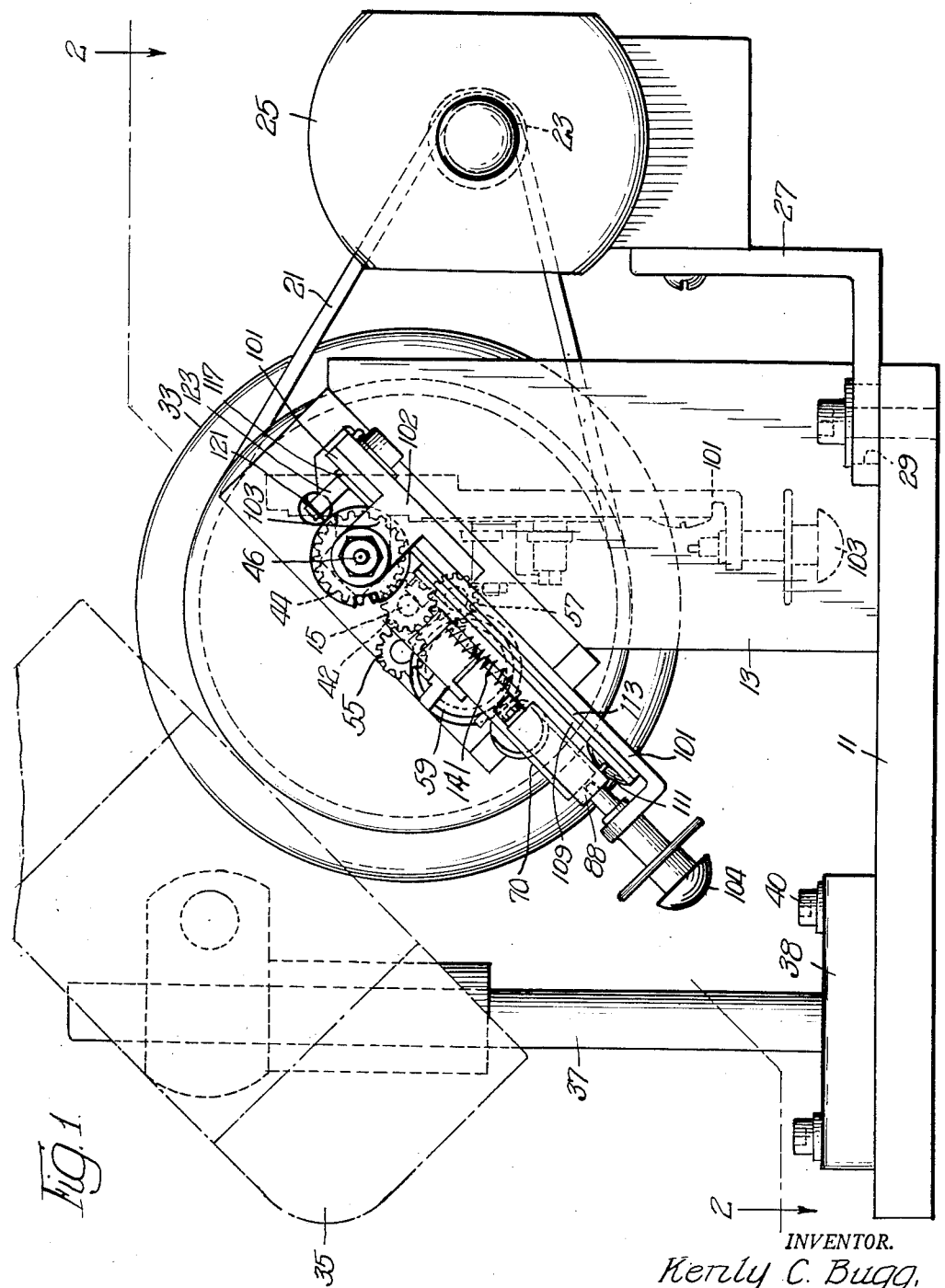

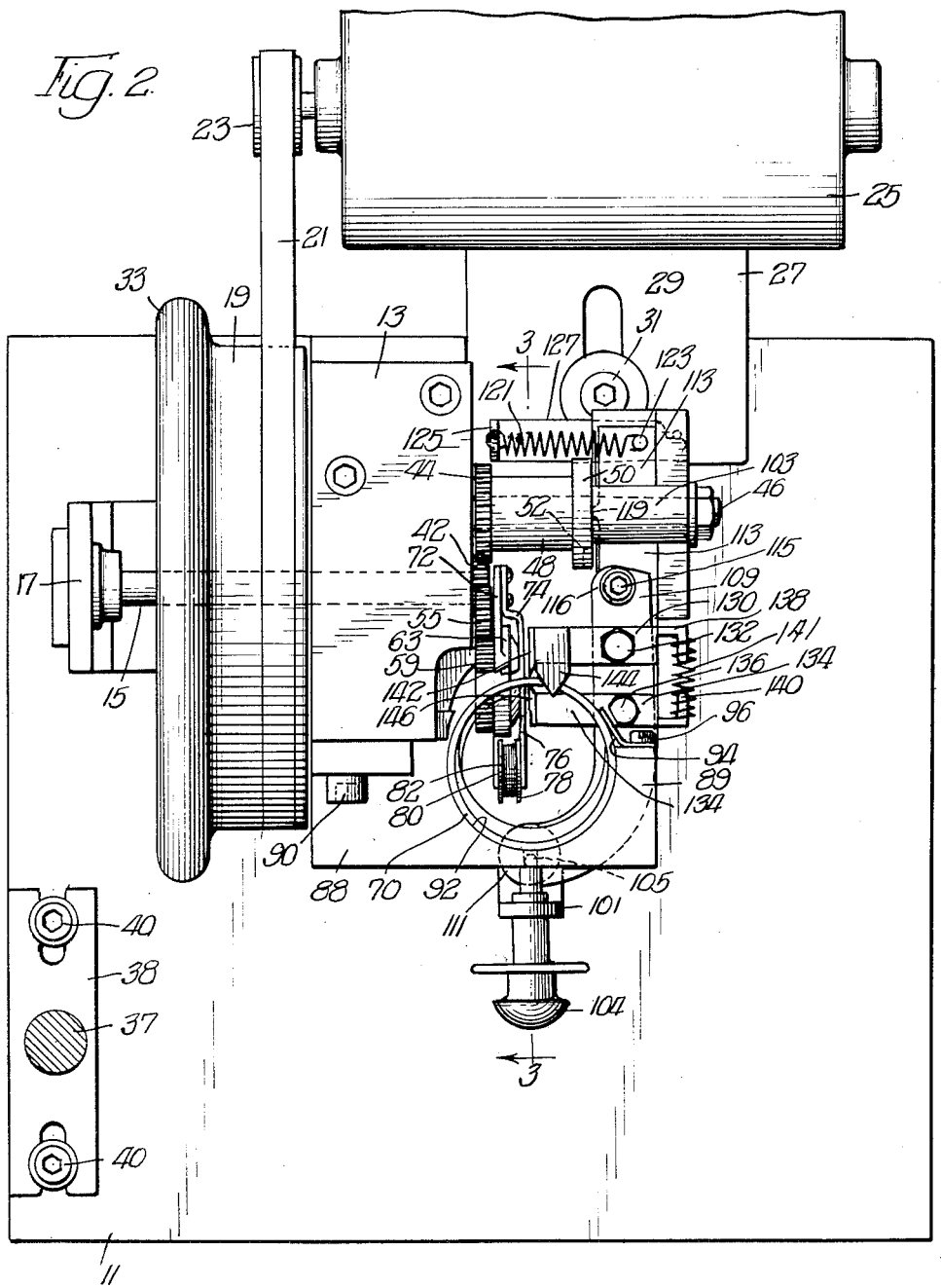

United States Patent Office 2,757,873
Patented Aug. 7, 1956

2,757,873

COIL WINDING MACHINE

Kenly C. Bugg, Fort Wayne, Ind.

Application July 2, 1952, Serial No. 296,784

12 Claims. (Cl. 242—4)

This invention relates to a new and improved apparatus for winding coils and more particularly to an apparatus especially adapted for winding coils on toroidal cores.

There are numerous electrical and electronic circuits and devices which require the use of coils on toroidal cores, such coils being utilized as resistances or inductances. For many such purposes great accuracy is required both in the total inductance or resistance provided by a coil wound on a standard core and in the uniformity of distribution of that inductance or resistance as it is wound circumferentially of the core. This accuracy may be such as to require a uniformity of turn spacing of less than a thousandth of an inch and a uniformity of coil turns on successive toroids such that there is a variation from a standard of less than one per cent plus or minus.

It is an object of the present invention to provide a new and improved coil winding apparatus.

It is a further object to provide apparatus of this character especially adapted for the winding of coils on toroidal cores.

It is also an object to provide such an apparatus capable of winding accurately and uniformly spaced coils on toroidal cores.

It is an additional object to provide such an apparatus adapted for use in winding coils with different sizes of wire and with different spacing between adjacent turns of wire.

It is another object to provide apparatus of this character adapted to interwind a plurality of coils on a toroidal form.

It is a further object to provide such apparatus which is compact and efficient in operation and adapted for commercial production and use.

Other and further objects will appear as the description proceeds.

I have shown certain preferred embodiments of my invention in the accompanying drawings in which—

Figure 1 is a side elevation of the apparatus;

Figure 2 is a plan view of the apparatus taken on line 2—2 of Figure 1;

Figure 3 is a vertical section taken on line 3—3 of Figure 2;

Figure 4 is an enlarged face view of the winding head;

Figure 5 is a fragmentary section, on an enlarged scale, showing a coil and core in relation to the winding head and pusher fingers;

Figure 6 is a face view of a modified form of winding head;

Figure 7 is a fragmentary section showing one form of multiple winding; and

Figure 8 is a view similar to Figure 7 showing a modified form of multiple winding.

Referring first to Figures 1 and 2 of the drawing, the apparatus is shown mounted on a base 11 and supported from that base by a rigid standard 13. This standard 13 provides a bearing for the drive shaft 15, the opposite end of which is supported in the side bearing 17. The drive wheel 19 is keyed to shaft 15 and serves as a pulley coacting with the drive belt 21 which is driven by pulley 23 on electric drive motor 25. The motor 25 is supported on an angle bracket 27, the lower leg of which is provided with an elongated slot 29 so that the bracket is adjustably held in place on the base 11 by the machine bolt 31. This adjustment provides for maintaining the proper tension on the drive belt.

The drive wheel 19 is provided with an outer circumferential hand grip portion 33 so that the mechanism may be manually rotated. This is important in starting and stopping the winding or taking off taps at exact points in the winding and on the toroidal core. It will be understood that the machine is motor driven at comparatively high speed and for accurate adjustment it is necessary to rotate the drive gear at times by hand. The base 11 is also shown as supporting an illuminated magnifier 35 which is adjustably mounted on a standard 37 having a foot 38 adjustably secured to the base 11 by means of the machine screws 40. This magnifier may be of any standard commercial construction and forms no part of the present invention.

The drive shaft 15 carries a small gear 42 adjacent the inner face of the standard 13. This gear 42 meshes with a large upper driven gear 44 which rotates freely on a shaft 46 extending laterally from the standard 13. The gear 44 is integrally connected to an elongated hub 48, the outer end of which carries a cam disc 50 having a small depressed cam surface or cam drop 52 in its outer lateral face. The function of this cam will be described in detail hereinafter.

The drive gear 42 meshes with a pair of spaced idler gears 55 and 57 which in turn mesh with an interrupted gear 59, which latter gear serves to drive the winding head. It will be understood that the purpose of having two idler gears 55 and 57 is to enable a positive and continuous drive of interrupted gear 59, as one of the idler gears will be in mesh with the gear 59 when the other idler gear is opposite the interruption in gear 59.

As best shown in Figure 5, the interrupted gear 59 rotates on the winding head support member 61 which is fixedly secured to the standard 13. The gear 59 has an outer flange 63 fitting around the circumference of the winding head 65 of member 61 and is held in place between the head 65 and the standard 13. It will be understood that support member 61 and head 65 are fixed and do not rotate. The head 65 and adjacent portion of member 61 are provided with a slot 67 adapted to receive the toroidal core 70 on which the coil is to be wound.

The flange 63 of the winding head is provided with an extension 72, as shown in Figures 2, 3 and 4, to which is secured a bobbin hold down 74 formed of thin resilient metal. This bobbin hold down 74 has an arcuate arm 76 extending downwardly to a point opposite the extension 72, this downwardly extending arm 76 having a central boss 77 adapted to interfit in the central opening of bobbin 78. The member 63 also has a lower arm 80 opposite the lower end portion 76 of member 74, this arm 80 carrying a boss 82 aligned with boss 74. The bobbin 78 is therefore resiliently held against boss 82 by means of the boss 77 of arm 76, but is free to rotate on bosses 77 and 82. As best shown in Figure 3, the portion 76 of member 74 is also provided with a guide notch 84 through which the wire passing from bobbin 78 is guided in its winding movement about the toroidal core 70. As clearly shown in Figures 3 and 4, the break in the gear 59 and its flange 63 are located in alignment with the notch 67 in head 65 when the toroidal core 70 is inserted in the machine or removed therefrom.

A support arm 88 is secured to standard 13 by bolt 90, this arm 88 having a semi-circular recess 92 formed therein to receive the toroidal core 70. The outer portion 89 of the support arm 88 has a spring hold down clip 94 secured thereto by machine screw 96. This clip 94 is yielding to permit the toroid to be inserted, but has sufficient resilience to hold the toroid down while permitting it to be rotated in the seat 92 during the winding operation.

A swinging support member 101 has its upper end secured to member 102, which member is provided with a sleeve portion 103 pivotally supported on shaft 46 and may be swung downwardly to bring it to a vertical position, as clearly shown in broken lines in Figure 1. This support arm 101 is provided with a finger piece 104 which is normally urged inwardly by an enclosed spring (not shown) so that the holding lug 105 fits in a recess 107 in the lower face of the support arm 88. The member 101 is thus normally held in position as shown in full lines in Figure 1.

The short pusher support arm 109 has its lower end pivotally mounted on the pivot member 111 which is secured to the swinging support member 101. A lower longer pusher drive arm 113 is also pivoted on member 111, the short arm 109 being adjustably secured to member 113 by screw 115 and moving with member 113. The screw 115 fits in a slot 116 in member 109 and permits adjustment of arm 109 relative to arm 113. The upper free end 117 of member 113 rests on member 101 below the sleeve portion 103 of member 102. This upper portion 117 of the pusher drive arm 113 has a short cam lug 119 on its left face, as seen in Figure 2, this cam lug serving to coact with the cam drop 52 on member 50 to permit a short quick movement to the left of the upper end 117 of arm 113 when the lug 119 is opposite the cam drop 52, the arm 113 moving about its pivot at 111. The upper end of member 113 is urged to the left by means of the tension spring 121, one end of which is secured to pin 123 on member 113 while the other end is hooked into an upturned end 125 of an arm 127 fixedly secured to the upper end of the member 102.

The short pusher support arm 109 has pivotally secured thereto the upper pusher arm 130, this arm being pivoted on member 132. The lower pusher arm 134 is also pivotally supported from member 109 on pivot member 136. The outer ends of pusher arms 130 and 134 are turned toward each other, as shown at 138 and 140, and a compression spring 141 is mounted on these arms urging their right ends apart which urges their left ends towards each other. The left end of arm 130 carries the pusher blade 142 and the adjacent portion of arm 130 carries on its front the hold down finger 144. The left end of arm 134 carries the lower pusher blade 146. As will be clearly seen in Figures 2 and 5, these pusher blades 142 and 146, when thrust to the left, engage the wire 148 and move the toroid 70 and its winding to the left or in a counterclockwise direction. Their initial and pushing positions may be varied by adjusting the relationship of arm 109 to arm 113 by means of screw 115 and slot 116.

Figure 6 shows a modified construction of winding head 150 having an upper arm 152 to which is secured the bobbin support arm 154. The lower part of this arm 154 has a pair of ears 156 and 158 which are provided with the depressed bosses 160 and 162, respectively. These bosses coact with similar bosses on the winding head 150 to retain in place the bobbins 164 and 166. Guide slot 168 is located for guiding the wire or other filament from bobbin 164 and a similar slot 170 is located adjacent bobbin 166. With the use of this type of bobbin it is possible to interwind two wires or other filaments as shown in Figures 7 and 8. In Figure 7, wires 172 are shown as interwound with smaller wires or other filaments 174. In Figure 8, the two interwound filaments 176 and 178 are of the same size and the spacing filament may be removed, if desired, after the coil is wound.

It may be desired to interwind filaments or other wires in the manner shown for permanent windings or the intermediate wire or filament may merely serve as a spacer to accurately space and if desired, to form insulation between the turns of the main winding. For example, when winding turns of very fine wire to provide a coil having extremely uniform spacing between the turns, this spacing may be rendered more uniform by interwinding another wire or filament. The filament may be of insulating material such, for example, as nylon or other synthetic fibre. It has been found that the practical matter when dealing with winding tolerances in the nature of ten thousandths of an inch, the thickness of the enamel on coated wire may vary sufficiently so as to throw the winding off. Any error is also cumulative and may throw off the total turns on a toroid beyond the limits of tolerance allowed. The bare wire itself and nylon fibres may be provided with a greater degree of accuracy as to diameter so that a coil wound such as shown in Figures 7 and 8 may be extremely accurate as to spacing. Since the turns of wire are permanently separated by insulation they may be wound of bare wire. It will be understood, of course, that the toroid 70 would normally be given an insulating coating so that the turns would not be shorted to the core.

It is believed that the general operation of the apparatus will be understood from the detailed description thereof which has been given. To insert a toroidal core 70 the finger piece 104 is pulled out to disengage the lug 105 from its notch in the support arm 88. This serves to swing the pusher blades and arms downwardly to the position shown in broken lines in Figure 1. The hand wheel 33 will then be turned to bring the break in the winding head opposite the break in the winding head support 65, as shown, for example, in Figure 4. A toroid 70, as shown, is then inserted to bring it to the position shown in Figure 4 as far as the winding head and its support are concerned and the lower portion of the toroidal core 70 will fit into the arcuate recess 92 in the support arm 88. The hold down spring 94 is pressed upward as necessary to permit the toroidal core to be inserted and then serves to hold the core lightly but firmly in place.

The wire from the bobbin 78 has its end drawn out and through the guide notch 84, shown in Figure 3, after which it is turned partly around the core 70 and its end may be secured to an adjacent fixed portion of the structure by means of adhesive tape or the like. A sufficient length of wire is drawn out to provide the lead desired from the toroidal coil. The outer ends then of the pusher arms 130 and 142 are gripped with the finger of one hand while the other hand grips the finger piece 104, pulling down on it. The pusher support arms are pushed together against the resistance of spring 141 sufficiently so that as the knob 104 is moved from the broken line position of Figure 1 to the full line position of that figure, the pusher blades 142 and 146 and the hold down finger 144 will clear the toroidal core 70. The lug 105 snaps into place holding the parts in the full line position shown in Figure 1.

The motor 25 is then put in operation and rotates the drive gear 42 thus through idler gears 55 and 57 rotating the winding head gear 59 and therefore rotating the entire winding head including the bobbin. This serves to wind a turn of wire about the toroidal core 70. At one point in each turn of winding when the bobbin is above the core or in approximately the opposite position to that which it is shown in Figure 4, the cam lug 119 drops into the cam drop 52, this causes the pusher blades 142 and 146 to engage the last wound upper and lower turn portions of the coil and to move the toroid 70 and the coil thereon in the counterclockwise direction as seen in the drawings. It is to be noted that the pusher blades 142 and 146 may be offset an amount sufficient to allow for the angular difference between the upper and lower halves of a turn so that they engage the two halves of a wire turn simultaneously. It is to be further noted that the pusher blades are not intended to push one turn of wire against the adjacent and last wound turn, but to move the whole toroid and coil so as to uniformly space the turns rather than wind them in contact. It will also be understood, however, that it will be possible to so operate the machine with less tight winding that the pusher blades will serve to insure exact contact between the adjacent turns. It may, for example, be desirable to operate the apparatus in that manner when winding interwound turns, as shown in Figures 7 and 8, so as to insure accurate spacing of the turns by contact between adjacent turns.

When the winding is complete the toroidal core and the wound coil may be removed by the reverse of the operations described in connection with inserting the toroidal core. It will be understood that the winding may be stopped at any desired point to draw off leads for taps on the coil. While no turn counting device has been shown in the drawings it will be understood that a standard type of such device will normally be so connected as to be positively driven by the drive shaft 15 since it is usually essential to know the exact number of turns on the entire coil and often to know the number of turns for making an intermediate stop to pull off a tap.

It will be understood that while each size of machine will operate to handle a reasonable range of sizes of toroidal cores, the machines may be made of varying sizes. Different support arms 88 having different arcuate core supports therein may be substituted to change the range of any given machine. Also, different winding heads such, for example, as that shown in Figure 6 may be substituted on a machine for winding multiple coils when desired. Normally the winding head remains on the machine, the only substitution being the removal of an empty bobbin by snapping it out of position and replacing it with a full bobbin.

While I have shown certain preferred embodiments of the apparatus, these are to be understood to be illustrative only as it is capable of variation to meet differing conditions and requirements and I contemplate such modifications as come within the spirit and scope of the appended claims.

I claim:

1. An apparatus for winding single layer wire coils on toroidal cores comprising means for supporting a core, a winding head having a slot therein to permit lateral insertion of a core in the head, means for rotating the head, and intermittently operating means for periodically temporarily engaging the last turn of a coil wound on a core to intermittently move the core relative to the head.

2. An apparatus for winding single layer wire coils on a toroidal core comprising means for supporting the core, a winding head having a slot therein to permit lateral insertion of a sector of a toroidal core, a wire supply carried by the head, means for rotating the head to wind the wire about the core, and means for periodically moving the core relative to the winding head, said last named means comprising a member intermittently engaging the last wound turn of a coil wound on the core.

3. An apparatus for winding coils on a toroidal core comprising means for supporting the core, a winding head having a slot therein to permit lateral insertion of a sector of a toroidal core, a filament supply carried by the head, means for rotating the head to wind the filament about the core, and means for periodically moving the core relative to the winding head, said last named means comprising pusher blades intermittently engaging the filament wound on the core.

4. An apparatus for winding single layer wire coils on a toroidal core comprising means for supporting the core, said means having an arcuate core seat, resilient means yieldingly holding the core in its seat, a winding head having a slot therein to permit lateral insertion of a sector of a toroidal core into the head with the core in the core seat, and means for temporarily engaging a lateral face of the last wound turn of wire on the core for giving an intermittent rotational movement in the seat to the core.

5. An apparatus for winding coils on a toroidal core comprising means for supporting the core, said means having an arcuate core seat, resilient means yieldingly holding the core in its seat, a winding head having a slot therein to permit lateral insertion of a sector of a toroidal core into the head with the core in the core seat, and means for giving an intermittent rotational movement in the seat to the core, said last named means comprising intermittently movable pusher members serving to give a limited push to a filament wound on the core.

6. An apparatus for winding coils on a toroidal core comprising means for supporting the core, said means having an arcuate core seat, resilient means yieldingly holding the core in its seat, a winding head having a slot therein to permit lateral insertion of a sector of a toroidal core into the head with the core in the core seat, gear means for rotating the winding head, means for giving an intermittent rotational movement in the seat to the core, and cam means driven by the winding head gear means for actuating the means for rotating the core.

7. An apparatus for winding coils on a toroidal core comprising means for supporting the core, said means having an arcuate core seat, resilient means yieldingly holding the core in its seat, a winding head having a slot therein to permit lateral insertion of a sector of a toroidal core into the head with the core in the core seat, means for giving an intermittent rotational movement in the seat to the core, said last named means comprising pusher members serving to give a limited push to a filament wound on the core, and a pivoted support for the pusher members whereby they may be swung clear of the core and winding head.

8. An apparatus for winding coils on a toroidal core comprising a fixed core seat for supporting the core, said seat having a lateral, arcuate core supporting wall, a rotary winding head adjacent the seat, said head having a slot therein to admit a sector of the core, a bobbin carried by the head and rotatable by the head around the core sector, and a resilient hold down finger adapted to hold the core against the arcuate wall of the core seat and in the winding head slot and to permit the core to be rotated relative to the seat.

9. An apparatus for winding coils on a toroidal core comprising a fixed core seat for supporting the core, a rotary winding head adjacent the seat, said head having a slot therein to admit a sector of the core, a bobbin carried by the head and rotatable by the head around the core sector, pusher members serving to engage a coil wound on the core to move the core in its seat, and an adjustable support for the pusher members whereby the amount of core movement may be varied.

10. An apparatus for winding coils on a toroidal core comprising a fixed core seat for supporting the core, a rotary winding head adjacent the seat, said head having a slot therein to admit a sector of the core, a bobbin carried by the head and rotatable by the head around the core sector, pusher members serving to engage a coil wound on the core to move the core in its seat, an adjustable support for the pusher members whereby the amount of core movement may be varied, and a hold down finger adapted to hold the core in the core seat and in the winding head slot.

11. An apparatus for winding coils in a toroidal core comprising a fixed core seat for supporting the core, a rotary winding head adjacent the seat, said head having a slot therein to admit a sector of the core, a bobbin carried by the head and rotatable by the head around the core sector, pusher members serving to engage a coil wound on the core to move the core in its seat, an adjustable support for the pusher members whereby the amount of core movement may be varied, a hold down finger adapted to hold the core in the core seat and in the winding head slot, and a swinging support for the pusher member assembly whereby it may be moved clear of the core.

12. Apparatus for winding coils on a toroidal core comprising a slotted winding head, a gear connected to the winding head, gear means for driving said gear, means for holding a sector of a toroidal core in the slot of the winding head, and means for giving a rotational movement to the core, said means comprising pusher members for engaging a coil on the core to move the core, a swinging support for the pusher members, resilient means urging the pusher members in one direction and cam means driven by the winding head gear driving means for controlling action of the resilient means.

References Cited in the file of this patent

UNITED STATES PATENTS

| | | |
|---|---|---|
| 928,592 | Downs | July 20, 1909 |
| 1,061,543 | Hunz | May 13, 1913 |
| 1,812,349 | Lillibridge | June 30, 1931 |
| 1,879,882 | Pullets | Sept. 27, 1932 |
| 2,174,754 | Miller | Oct. 3, 1939 |
| 2,313,618 | Bridges | Mar. 9, 1943 |
| 2,341,111 | Menzinger | Feb. 8, 1944 |
| 2,393,548 | McCoy | Jan. 22, 1946 |
| 2,437,309 | Veatch | Mar. 9, 1948 |
| 2,444,126 | Wirth | June 26, 1948 |
| 2,467,643 | Wirth | Apr. 19, 1949 |
| 2,569,292 | Dehmel | Sept. 25, 1951 |
| 2,569,657 | De Beauregard | Oct. 2, 1951 |
| 2,649,251 | Nordell | Aug. 18, 1953 |